May 18, 1954  H. E. JENSEN  2,678,962
TERMINAL POST MOUNTING FOR PLASTIC BATTERY COVERS
Filed June 5, 1952
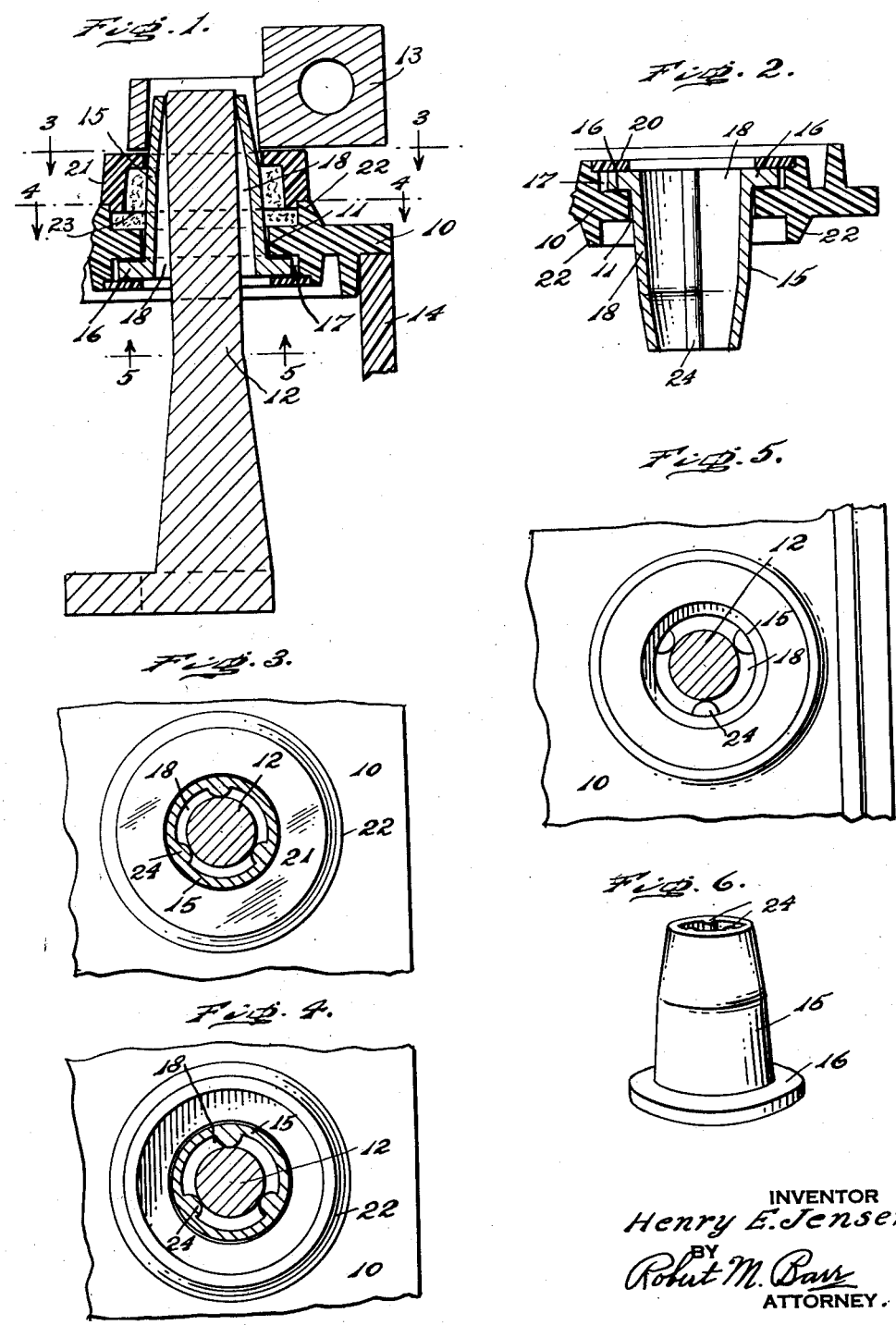
INVENTOR
Henry E. Jensen.
BY
Robert M. Barr
ATTORNEY.

Patented May 18, 1954

2,678,962

UNITED STATES PATENT OFFICE 2,678,962

TERMINAL POST MOUNTING FOR PLASTIC BATTERY COVERS

Henry E. Jensen, Norristown, Pa., assignor to C & D Batteries, Inc., Conshohocken, Pa., a corporation of Pennsylvania Application June 5, 1952, Serial No. 291,903

2 Claims. (Cl. 136—168)

The present invention relates to storage batteries and more particularly to a means for attaching a plastic battery cover to the terminal posts of a battery.

Heretofore when a plastic cover seats upon the upper margin of a battery case the plane of the inner face of the cover does not always coincide with the upper face of the clamping flange or shoulder on the usual post. This is due to variation in the castings of the post plate assembly causing an upward central deflection of the cover when the aforesaid shoulder is too high, and a like downward central deflection of the cover when the shoulder is too low. This latter deflection takes place when the outer nut clamps the cover against the shoulder, and consequently this compressive action weakens the cover about the post.

An object of the present invention is to provide an attaching means between a battery post and a plastic cover, which maintains the planar condition of the cover regardless of vertical variations in length of the casting of the post plate assembly;

Another object is to provide a plastic attaching means for battery posts wherein the means become an integral part of a plastic cover;

Another object is to provide a combination of plastic and lead parts as an attaching means for a plastic cover to a lead terminal post;

Another object is to provide a terminal post assembly for plastic battery covers wherein a lead insert is associated with the post and functions to prevent acid from seeping into contact with the protruding end of the post;

Another object is to provide a terminal post assembly for plastic battery covers wherein compression forces are eliminated upon the cover;

A still further object is to provide a terminal post assembly for plastic battery covers wherein it is now possible to provide for the difference in the temperature coefficient of lead and plastic, thereby eliminating stresses and strains leading to cracking and crazing of rigid plastics occurring when lead inserts are molded directly into the plastic; and to provide other improvements as will hereinafter appear.

In the accompanying drawing, Fig. 1 is a sectional elevational view of a terminal post assembly embodying one form of the present invention; Fig. 2 represents a sectional detail showing a step in the assembly of the parts; Fig. 3 represents a section on line 3—3 of Fig. 1; Fig. 4 represents a section on line 4—4 of Fig. 1; Fig. 5 is a section on line 5—5 of Fig. 1; Fig. 6 represents a perspective of one form of lead insert as a part of the assembly.

Referring to the drawings, a portion of the cover 10 of a storage battery is shown including one post hole 11, such, for example, the one through which the positive terminal lead post 12 passes for connection to a terminal 13. The invention as described also applies, as will be understood, to the negative terminal post. Primarily the invention relates to a cover formed or molded of synthetic plastic, such as polystyrene, and is dimensioned to seat marginally upon the top of the battery case 14 where it is sealed in place. The post 12 is generally cylindrical from its cover protruding end to a point well within the cell to be axially spaced from the inner face of the cover 10. The essential feature is that the post has no shoulder or flange to abut the said inner face of the cover and therefore the invention makes possible the attachment of the post to the cover without compressive clamping or deforming of the cover. The post 12 forms an integral part of the cell plates, that is the positive plates join the positive post, while the negative plates join the negative post.

As an associated part of the attaching means of the invention, a tubular lead insert 15 is provided, having a base flange 16 to seat in a counterbore 17 in the inner face of the cover 10 and coaxial of the post hole 11. In assembled condition the insert 15 encircles the post 12 to provide a clearance 18, which is closed at the post end by converging the insert wall into contact with the post, at which area the two parts are burned together as an integral unit. As so joined, the insert forms a shield about the protruding end of the post 12 to prevent acid from leaking out of the clearance 18. The insert 15 is assembled before the cover 10 is placed on the case 14, by inverting the cover 10 and dropping the insert through the post hole, where it is supported, as shown in Fig. 2, by the flange 16 seating in the counterbore 17. As so located, an annular plastic disc 20 is brought into face contact with the exposed face of the flange 16 and bonded to the cover by a plastic cement or by heat sealing. Preferably, the disc 20 seats in a second counterbore of the cover provided for the purpose. As soon as the disc 20 and cover 10 become integral, the cover is reversed and placed on the battery with the terminal post 12 encircled by the insert, as explained.

In order to concentrically anchor the insert to the cover, a cup-shaped plastic ring 21 encircles the insert to seat upon an upstanding annular boss 22 molded on the outer face of the cover. The opposed end of the ring 21 is circumferentially shouldered to seat upon the boss 22 and to which it is bonded by a solvent cement. The internal diameters of the respective boss 22 and ring 21 are such as to provide a common annular space 23 with respect to the insert which is then filled with a sealing grease. When the parts are thus assembled, the cover 10, the disc 20, and the ring 21 form an integral unit anchoring the insert 15 in place, with its upper end protruding through the ring 21 into circumferential contact with the post 12. As so positioned, the respective ends of the lead insert and the lead post are burned together to form an integral assembly and also closing communication between the clearance 18 and the atmosphere whereby acid is prevented from creeping out of the clearance. As a final step in the assembly, it is preferable to mount the lead cable connector 13 telescopically about the protruding post assembly where it is burned into place.

As a means to maintain the post 12 centered and prevent lateral slipping of the post and plates during handling of the battery, internal radially disposed ribs 24 are cast integral with the insert to contact the side of the post. Preferably, three such ribs 24 are provided and properly spaced angularly about the inner periphery of the insert.

It will now be apparent that a complete unitary mounting has been devised for assembling a plastic battery cover to a terminal post without the customary shoulder or flange on the post as a clamping element under pressure of an applied nut. Furthermore, the novel assembly eliminates the usual rubber gaskets which heretofore deteriorate long before the useful life of the battery. Also, the present novel construction makes possible self-adjustment of the cover about the posts so that variations in the overall length of the build-up of the element assembly has no disadvantageous action against the cover to cause distortion and misalignment. Furthermore, by the present invention it is now possible to lead burn terminals into place on plastic covers, which heretofore has been impossible without causing crazing of the plastic.

Having thus described my invention, I claim:

1. In a battery post assembly the combination of a plastic battery cover having a post hole, a lead terminal post protruding through said hole, a tubular lead insert encircling said post in spaced relation to provide a clearance, the outer end of said insert being integrally connected to said post to seal said clearance from the atmosphere, plastic means for holding said insert properly positioned through said cover, said means being bonded to the outer face of said cover as an integral part thereof, and a second plastic means bonded to the inner face of said cover as an integral part thereof underlying said insert as a support and joint seal, whereby compressing clamping of said cover by said assembly is eliminated.

2. In a battery post assembly, the combination of a plastic battery cover having a post hole, a lead terminal post protruding through said hole, said post being cylindrical from its outer end to a point within the battery and axially spaced from the inner face of said cover, a tubular lead insert encircling said post to form a longitudinal vertical clearance, having an outer end converging into contact with said post for integral connection thereto to seal said clearance to the atmosphere, longitudinally displaced internal ribs on said insert contacting said post as a position retaining means, and insert-retaining means comprising a plastic ring integrally connected to the outer face of said cover and a plastic disc integrally connected to the inner face of said cover.

References Cited in the file of this patent

UNITED STATES PATENTS

| Number | Name | Date |
|---|---|---|
| 1,214,647 | Carpenter et al. | Feb. 6, 1917 |
| 1,225,297 | Willard | May 8, 1917 |
| 1,411,414 | Cook | Apr. 4, 1922 |
| 1,680,038 | Dunzweiler | Aug. 7, 1928 |
| 2,031,378 | Lormor | Feb. 18, 1936 |
| 2,100,921 | Rolph | Nov. 30, 1937 |
| 2,242,599 | Raney | May 20, 1941 |
| 2,512,080 | Wilson | June 20, 1950 |

FOREIGN PATENTS

| Number | Country | Date |
|---|---|---|
| 297,904 | Great Britain | Oct. 4, 1928 |
| 437,946 | Great Britain | Nov. 4, 1935 |